United States Patent
Wu et al.

(10) Patent No.: US 7,400,627 B2
(45) Date of Patent: Jul. 15, 2008

(54) ATM HEADER COMPRESSION USING HASH TABLES

(75) Inventors: Yan Wu, Morganville, NJ (US); Song Bi, Piscataway, NJ (US); Timothy Bornemisza, Middletown, NJ (US)

(73) Assignee: Brooktree Broadband Holding, Inc., Newport Beach, CA (US)

( * ) Notice: Subject to any disclaimer, the term of this patent is extended or adjusted under 35 U.S.C. 154(b) by 961 days.

(21) Appl. No.: 10/702,456

(22) Filed: Nov. 7, 2003

(65) Prior Publication Data

US 2004/0246966 A1 Dec. 9, 2004

Related U.S. Application Data

(60) Provisional application No. 60/475,911, filed on Jun. 5, 2003.

(51) Int. Cl.
*H04L 12/28* (2006.01)
*H04J 3/24* (2006.01)

(52) U.S. Cl. ............... 370/392; 370/395.1; 370/474

(58) Field of Classification Search ........... 370/389, 370/395.1, 395.32, 392, 474
See application file for complete search history.

(56) References Cited

U.S. PATENT DOCUMENTS

| | | | |
|---|---|---|---|
| 5,287,355 A | 2/1994 | Takahashi et al. | |
| 5,383,203 A | 1/1995 | Miyazono | |
| 5,414,701 A * | 5/1995 | Shtayer et al. | 370/395.3 |
| 5,758,089 A | 5/1998 | Gentry et al. | |
| 5,844,923 A | 12/1998 | Condon | |
| 5,987,007 A | 11/1999 | Molin et al. | |
| 6,111,871 A * | 8/2000 | Chen et al. | 370/349 |
| 6,151,314 A | 11/2000 | Rauhala | |
| 6,289,020 B1 * | 9/2001 | Sakaguchi | 370/395.71 |
| 6,327,261 B1 | 12/2001 | Makoua et al. | |
| 6,452,939 B1 | 9/2002 | Yang et al. | |
| 6,483,838 B1 | 11/2002 | Östman et al. | |
| 6,535,526 B1 | 3/2003 | Oyamada et al. | |
| 6,556,570 B1 | 4/2003 | Delattre et al. | |
| 6,594,262 B1 | 7/2003 | Kwon et al. | |
| 7,154,895 B1 * | 12/2006 | Bornemisza et al. | 370/395.1 |
| 2002/0001312 A1 | 1/2002 | Tomizawa | |
| 2003/0137995 A1 * | 7/2003 | Defoort | 370/474 |

FOREIGN PATENT DOCUMENTS

WO  WO199904522  1/1999

OTHER PUBLICATIONS

European Search Report.

* cited by examiner

*Primary Examiner*—Wing F. Chan
*Assistant Examiner*—Hong Sol Cho
(74) *Attorney, Agent, or Firm*—Thomas, Kayden, Horstemeyer & Risley LLP

(57) ABSTRACT

Disclosed are exemplary techniques for compressing ATM cells by substituting reduced headers for the original headers. A header table may be maintained at the transmitting end whereby headers are stored in table entries based on a table index generated from a hash function applied to the headers. A copy of the header table may be maintained at the receiving end and may be updated by populating idle cells with header table contents. Upon receipt of a reduced ATM cell at the receiving end, the reduced header may be replaced with a full header obtained from the copy of the header table maintained at the receiving end. The present invention further provides techniques for registration and management of hash collisions.

54 Claims, 6 Drawing Sheets

100

| | | |
|---|---|---|
| Byte 1 | GFC 102 | VPI 104 |
| Byte 2 | VPI 106 | VCI 108 |
| Byte 3 | VCI 110 | VCI 112 |
| Byte 4 | VCI 114 | PTI 116 / CLP 118 |
| Byte 5 | HEC 120 | |
| Byte 6 ... Byte 53 | Payload (48 bytes) 122 | |

Conventional ATM cell (53 bytes)

Fig. 1
(prior art)

Reduced ATM cell (49 bytes)

400

| Bit 7 | Bit 6 | Bit 5 | Bit 4 | Bit 3 | Bit 2 | Bit 1 | Bit 0 |
|---|---|---|---|---|---|---|---|
| Byte 1 — Flag 402 | Idle Cell Index (0x0F) 404 | | | | Update Flag 406 | Resv 408 | Parity 410 |
| Byte 2 — CRC 412 | | | | | | | |
| Byte 3 — Reserved 414 | | | | | | | |
| Byte 4 — Reserved 416 | | | | | | | |
| Byte 5 — HEC 418 | | | | | | | |
| Byte 6 ... Byte 49 — Header Table (4x11) 420 | | | | | | | |

Idle cell (49 bytes)

Fig. 4

ATM HEADER COMPRESSION USING HASH TABLES

CROSS-REFERENCE TO RELATED APPLICATION

The present invention claims benefit of U.S. Provisional Application No. 60/475,911, entitled "ATM Header Compression Using Hash Tables," filed Jun. 5, 2003, the entirety of which is hereby incorporated by reference herein.

FIELD OF THE INVENTION

The present invention relates generally to compression of asynchronous transfer mode (ATM) cells and more particularly to compression of ATM cell headers using hash tables.

BACKGROUND OF THE INVENTION

Asynchronous transfer mode (ATM)-based techniques frequently are used in data communication systems to provide for the reliability of circuit switching and the flexibility and efficiency of packet routing. ATM is particularly useful in digital subscriber line (xDSL)-based systems, such as asynchronous DSL (ADSL).

ATM provides for the transmission of fixed-sized cells which then may be grouped together into frames. Referring to FIG. 1, a conventional ATM cell 100 is illustrated. The ATM cell 100 typically is constructed of 53 bytes, five of which comprise the ATM header which contains information used for network management. Generally, the ATM header includes a generic flow control (GFC) field 102, one or more virtual path identifier (VPI) fields 104, 106, one or more virtual channel identifier (VCI) fields 108-114, a payload type indicator (PTI) field 116, a congestion loss priority (CLP) field 118 and a header error control (HEC) field 120. The remaining 48 bytes of the 53 byte ATM cell 100 typically are reserved for payload field 122.

While cell headers, frame headers, and superframe headers generally are necessary in ATM for proper network management, it will be appreciated that their use often limits the nominal data transfer rate over an ATM line. To illustrate, because only 48 bytes of the 53 byte ATM cell 100 represent payload data, conventional ATM has an efficiency of approximately 90.5% on a cell-by-cell basis. Improving the size of the payload compared to the size of the header would allow payload data to be transmitted at a greater bit rate. Accordingly, a process for improving the ratio of payload size to header size in ATM cells would be advantageous.

SUMMARY OF THE INVENTION

The present invention mitigates or solves the above-identified limitations in known solutions, as well as other unspecified deficiencies in known solutions. A number of advantages associated with the present invention are readily evident to those skilled in the art, including economy of design and resources, transparent operation, cost savings, etc.

Disclosed herein are exemplary techniques for compressing ATM cells by substituting reduced one byte headers for the original five byte headers. A header table may be maintained at the transmitting end whereby headers are stored in table entries based on a table index generated from a hash function applied to the headers. A copy of the header table may be maintained at the receiving end and may be updated by populating idle cells with header table contents. Techniques for header registration and managing hash collisions are also disclosed herein.

In accordance with one embodiment of the present invention, a method for communicating one or more asynchronous transfer mode (ATM) cells from a transmitting device to a receiving device via a network. The method comprises determining, for a first ATM cell, an index based at least in part on a header of the first ATM cell, identifying a first entry of a first header table using the index, the first header table being maintained by the transmitting device and having a plurality of entries storing header data, replacing the header of the first ATM cell with a reduced header to generate a reduced ATM cell based at least in part on a comparison of the header of the first ATM cell with header data stored at the first entry of the first header table, wherein the reduced header includes index data, and transmitting the reduced ATM cell for receipt by the receiving device.

In accordance with yet another embodiment of the present invention, a method for communicating one or more asynchronous transfer mode (ATM) cells from a transmitting device to a receiving device is provided. The method comprises receiving, at the receiving device, a first reduced ATM cell having a reduced header from the transmitting device, the reduced header including index data, identifying a first entry of a first header table using the index data, the first header table being maintained by the receiving device and having a plurality of entries storing header data, and replacing the reduced header of the first reduced ATM cell with header data stored at the first entry of the first header table to generate an unreduced ATM cell.

In accordance with yet another embodiment of the present invention, a transmitting device for communicating one or more asynchronous transfer mode (ATM) cells for receipt by a receiving device via a network is provided. The transmitting device comprises a header table having a plurality of entries for storing header data and a compression module having access to the header table. The compression module is adapted to determine, for a first ATM cell, an index based at least in part on a header of the first ATM cell, identify a first entry of the header table using the index, and replace the header of the first ATM cell with a reduced header to generate a reduced ATM cell based at least in part on a comparison of the header of the first ATM cell and a header stored at the first entry of the header table, the reduced header including index data. The transmitting device further comprises means for transmitting the reduced ATM cell for receipt by the receiving device.

In accordance with an additional embodiment of the present invention, a receiving device for receiving one or more asynchronous transfer mode (ATM) cells from a transmitting device via a network is provided. The receiving device comprises means for receiving a reduced ATM cell having a reduced header, the reduced header including index data, a header table having a plurality of entries for storing header data and a decompression module operably connected to the means for receiving the reduced ATM cell and having access to the header table. the decompression module is adapted to identify a first entry of the header table using the index data from the reduced header, the first entry storing header data and replace the reduced header of the first reduced ATM cell with the header data stored by the first entry to generate an unreduced ATM cell.

In accordance with yet another embodiment of the present invention, a system for communicating one or more asynchronous transfer mode (ATM) cells via a network is provided. The system comprises a transmitting device including a first header table having a plurality of entries for storing header data and a compression module having access to the first header table. The compression module is adapted to determine, for a first ATM cell, an index based at least in part on a header of the first ATM cell, identify a first entry of the first header table using the index, and replace the header of the first ATM cell with a reduced header to generate a reduced ATM cell based at least in part on a comparison of the header of the first ATM cell with header data stored at the first entry of the first header table, the reduced header including index data. The transmitting device further comprises means for transmitting the reduced ATM cell via the network. The system also comprises a receiving device operably connected to the transmitting device via the network and comprising means for receiving the reduced ATM cell via the network, a second header table having a plurality of entries for storing header data, the second header table being substantially equivalent to the first header table and a decompression module operably connected to the means for receiving the first reduced ATM cell and having access to the second header table. The decompression module is adapted to identify a first entry of the second header table using the index data from the reduced header of the reduced ATM cell, the first entry of the second header table storing header data and replace the reduced header of the reduced ATM cell with the header data stored at the first entry of the second header table to generate a second ATM cell substantially equivalent to the first ATM cell.

In accordance with an additional embodiment of the present invention, a computer readable medium for communicating one or more asynchronous transfer mode (ATM) cells from a transmitting device to a receiving device via a network is provided. The computer readable medium comprises a set of executable instructions adapted to manipulate a processor to determine, for a first ATM cell, an index based at least in part on a header of the first ATM cell, identify a first entry of a first header table using the index, the first header table being maintained by the transmitting device and having a plurality of entries storing header data, replace the header of the first ATM cell with a reduced header to generate a reduced ATM cell based at least in part on a comparison of the header of the first ATM cell with header data stored at the first entry of the first header table, wherein the reduced header includes index data, and provide the reduced ATM cell for transmission to receiving device.

In accordance with an additional embodiment of the present invention, a computer readable medium for communicating one or more asynchronous transfer mode (ATM) cells from a transmitting device to a receiving device is provided. The computer readable medium comprises a plurality of executable instructions adapted to manipulate a processor to receive, at the receiving device, a first reduced ATM cell having a reduced header from the transmitting device, the reduced header including index data, identify a first entry of a first header table using the index data, the first header table being maintained by the receiving device and having a plurality of entries storing header data, and replace the reduced header of the first reduced ATM cell with header data stored at the first entry of the first header table to generate an unreduced ATM cell.

Still further features and advantages of the present invention are identified in the ensuing description, with reference to the drawings identified below.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements, and in which:

FIG. 1 is a schematic diagram illustrating a conventional asynchronous transfer mode (ATM) cell.

FIG. 4 is a schematic diagram illustrating an exemplary idle cell for updating a receiving device of reduced ATM cells in accordance with at least one embodiment of the present invention.

DETAILED DESCRIPTION OF THE INVENTION

The following description is intended to convey a thorough understanding of the present invention by providing a number of specific embodiments and details involving ATM cell compression and decompression using hash tables. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Figure 2:
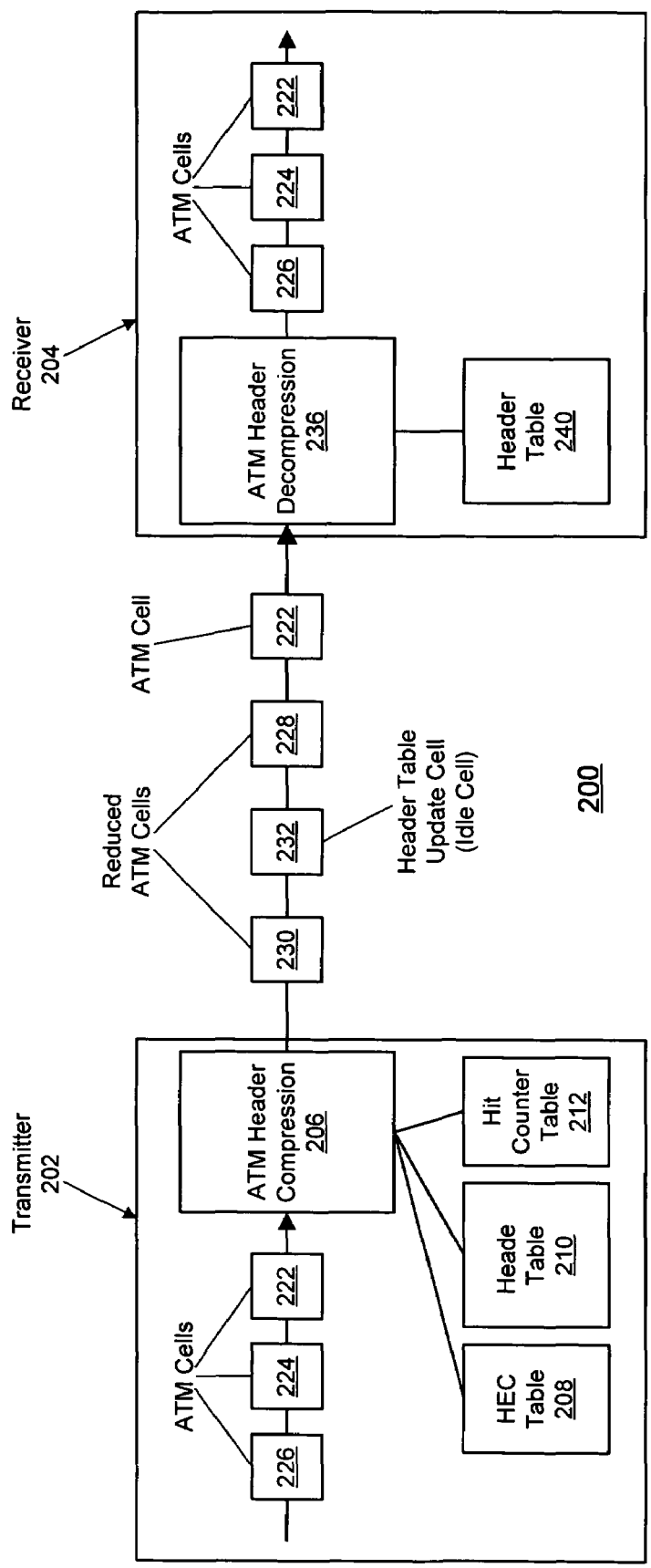
FIG. 2 is a schematic diagram illustrating an exemplary data transmission system having ATM header compression using a hash table in accordance with at least one embodiment of the present invention.

Referring now to FIG. 2, an exemplary ATM-based system 200 is illustrated in accordance with at least one embodiment of the present invention. The system 200 includes a data transmitting device 202 and a data receiving device 204 operably connected via a network formed of one or more transmission mediums (e.g., copper pair, fiber optic, wireless). The transmitting device 202 and receiving device 204 together may include any of a variety of data communication systems that implement ATM. For example, the transmitting device 202 may include a digital subscriber line (DSL) customer premise equipment (also known as a DSL "modem") and the receiving device 204 may include a DSL central office (also known as a DSL access multiplexer, or DSLAM). Further, in many such systems, data communications are bi-directional. The transmitting device 202 therefore may also be a receiving device 204 and vice versa.

The transmitting device 202 and receiving device 204 may be implemented as software, hardware, firmware, or a combination thereof. To illustrate, the devices 202, 204 each may implement a network interface, memory and one or more processors, and may include one or more sets of executable instructions stored in memory and adapted to manipulate the one or more processors to perform the functions described herein.

In the illustrated embodiment, the transmitting device 202 includes an ATM header compression module 206 adapted to replace the headers of some or all of the ATM cells to be transmitted with corresponding reduced headers, resulting in ATM cells that are reduced in size, or are "compressed." The ATM header compression module 206 may maintain a header error checksum (HEC) table 208, a header table 210 and/or a hit counter table 212 to facilitate the compression of outgoing ATM cells. As described in greater detail below, the header of an outgoing ATM cell may be processed by one or more hash functions to generate a hash table index. The header stored in the header table 210 at the hash table index, if any, may be compared to the header from the outgoing ATM cell. In the event that the hash table header and the outgoing ATM cell header don't substantially match, the ATM cell (e.g., ATM cell 222) may be transmitted in unmodified form to the receiving device 204.

In the event that the hash table header and the header of the outgoing ATM cell (e.g., ATM cell 224) substantially match, the five byte header of the outgoing ATM cell may be replaced with, for example, a reduced one byte header having the hash table index. The resulting reduced ATM cell (e.g., reduced ATM cell 228) with the reduced header then may be transmitted to the receiving device 204. An exemplary format of a reduced ATM cell having a reduced header is illustrated below with reference to FIG. 3.

In the event that no header is stored at the indexed hash table entry, the header of the outgoing ATM cell (e.g., ATM cell 226) may be stored at the hash table entry and the five byte header of the outgoing ATM cell may be replaced with a reduced header having the index of the hash table entry. After updating the header table 210 by storing the header at indicated hash table entry and prior to transmitting the outgoing ATM cell, the ATM header compression module 206 may generate an idle cell 232 having data representative of at least a portion of the updated header table 210. The transmitting device 202 then may transmit the idle cell 232 to the receiving device 204 so that the receiving device 204 may update its header table 240 to substantially match the contents of the header table 210. An exemplary format of the idle cell 232 is illustrated below with reference to FIG. 4.

An unreduced ATM cell (e.g., ATM cell 222) may be processed in a conventional manner at the receiving device 204. Reduced ATM cells (e.g., ATM cells 228, 230) typically require additional processing. To illustrate, upon receipt of the reduced ATM cell 228, the ATM header decompression module 236 may extract the header table index from the reduced header to identify an entry of the header table 240. The ATM decompression module 236 then may replace the reduced header of the ATM cell 228 with the header stored at the identified entry to convert the reduced ATM cell 228 to a substantial (or exact) equivalent of the original unreduced ATM cell 224, from which reduced ATM cell 228 was derived.

As noted above, the contents of the header table 210 may change when a new header is added to the header table 210 or an old header is replaced or removed. Accordingly, upon receipt of the idle cell 232 having the updated contents of the header table 210, the ATM header decompression module 236 may be adapted to update the contents of the header table 240 to substantially match the header table 210 prior to processing subsequent reduced ATM cells using the updated header table 240.

Figure 3:
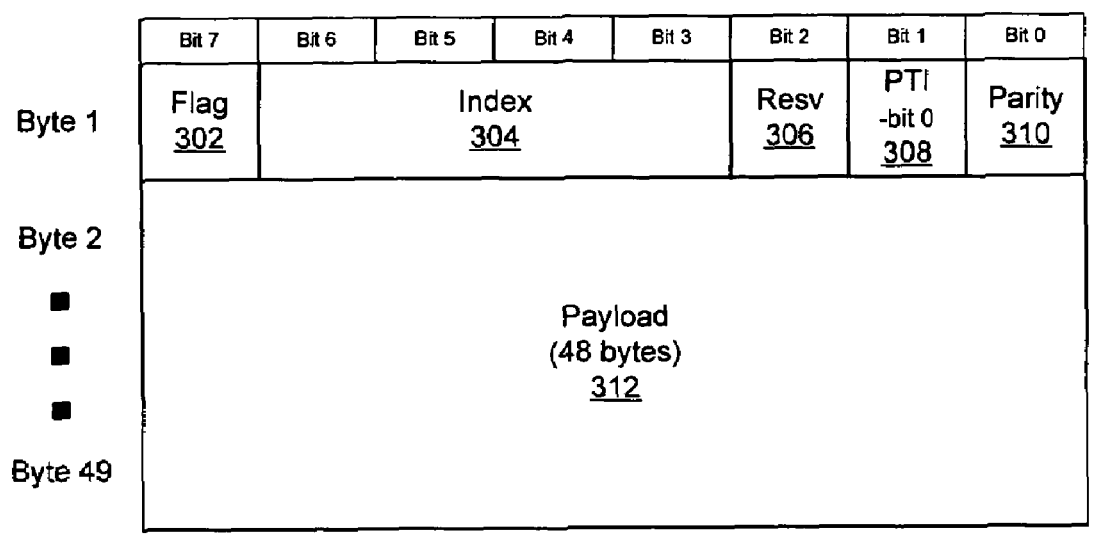
FIG. 3 is a schematic diagram illustrating an exemplary reduced ATM cell in accordance with at least one embodiment of the present invention.

Referring now to FIG. 3, an exemplary reduced ATM cell 300 having a reduced one byte header is illustrated in accordance with at least one embodiment of the present invention. In the illustrated example, the reduced header preferably includes a flag bit 302 having a value (e.g., 0x01) identifying the cell 300 as a reduced ATM cell. The reduced header further may include a hash table index field 304 for storing the index of the entry of the hash table 210 and hash table 240 (FIG. 2) used to store the original five byte header. The reduced header further may include a PTI-bit 0 field 308 to store the least significant bit of the PTI field 116 (FIG. 1) of the original five byte header. A reserved field 306 and a parity field 310 further may be implemented in the reduced header.

As with the conventional ATM cell 100 (FIG. 1), the reduced ATM cell 300 preferably includes a payload field 312 of 48 bytes. As a result, the ATM cell 300 has a total size of 49 bytes (1 byte of header, 48 bytes of payload). By replacing the original five byte headers of some or all outgoing ATM cells with reduced one byte headers, the ratio of the payload size to the overall cell size may be increased. For example, while the payload of a conventional ATM cell comprises only 90.5% of the total cell capacity, the payload of a reduced ATM cell having a reduced one byte header comprises over 97.96% of the total cell capacity, providing for a payload throughput improvement of over 7%. Furthermore, in a worst case scenario the payload throughput is not affected compared to conventional ATM techniques. Accordingly, a significant increase in the payload throughput may be achieved at the cost of minimal processing effort to maintain the tables 208, 210, 212 and 240 (FIG. 2).

Referring now to FIG. 4, an exemplary idle cell 400 for updating the hash table 240 of the receiving device 204 of FIG. 2 is illustrated in accordance with at least one embodiment of the present invention. In the illustrated example, the idle cell 400 includes a flag field 402 for identifying the cell 400 as a reduced ATM cell, an update flag field 406, reserved fields 408, 414, and 416 and a parity field 410. The idle cell 400 further may include an idle cell index field 404 to allow the receiving device 204 to identify the cell as an idle cell. The idle cell 400 preferably includes an HEC field 418 to provide error protection for the header. As noted above, in at least one embodiment, the idle cell 400 is utilized to transmit updates of the hash table 210 to the receiving device 204. Accordingly, the idle cell 400 may include a header table field 420. In at least one embodiment, the header table 210 is an eleven entry table, each entry having four bytes for a total of 44 bytes (4 bytes×11 table entries). In this case, the header table field 420 may incorporate 44 bytes of the cell 400 so that some or all of the contents of the header table 210 may be transmitted in a single idle cell 400. In other embodiments, the header table field 420 may be of a smaller or larger size to store a smaller or larger portion of the entries of the header table 210 or to accommodate header tables of different sizes. To protect the contents of the header table field 420, the idle cell 400 may further include a cyclical redundancy code (CRC) field 412 for storing the CRC of the contents of the header table field 420.

Figure 5:
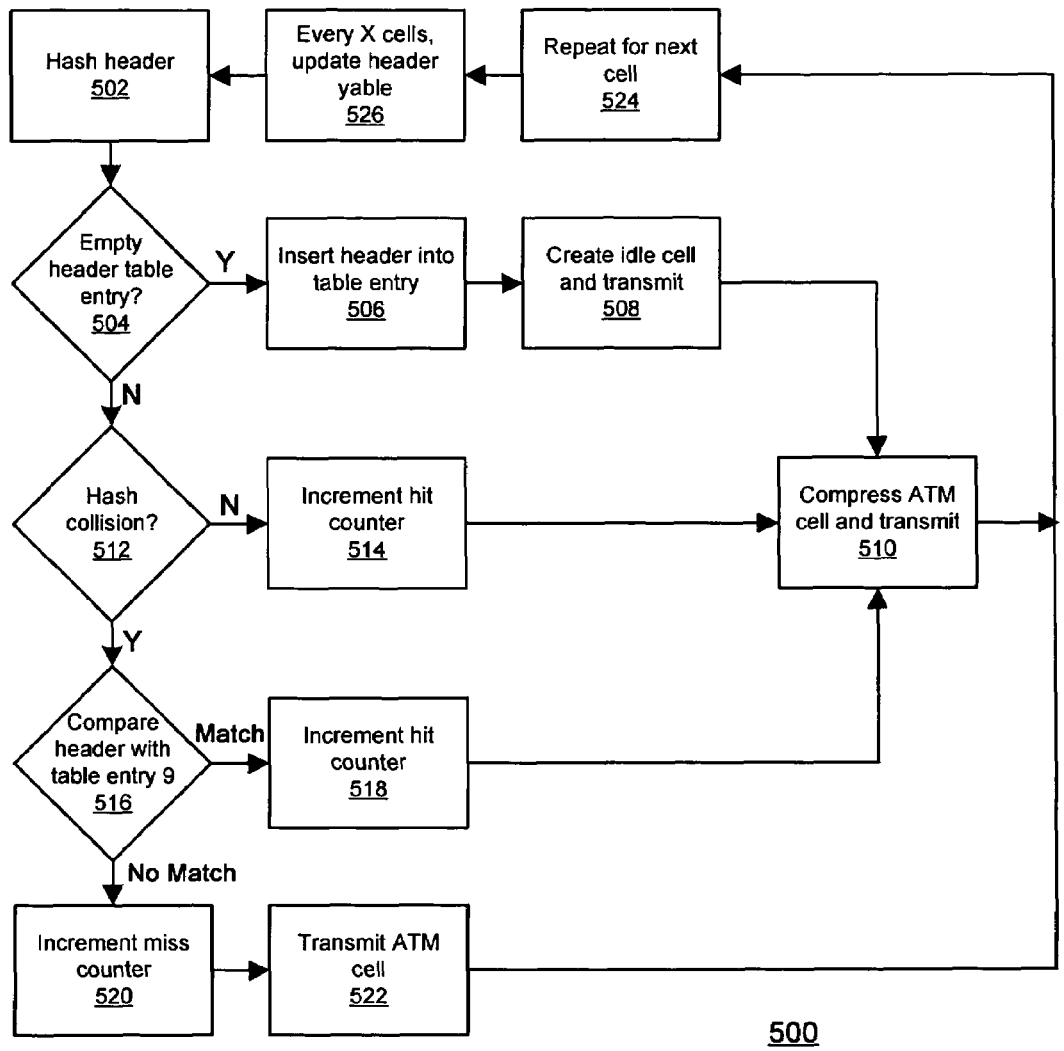
FIG. 5 is a flow diagram illustrating an exemplary technique for compressing ATM cells using a hash table in accordance with at least one embodiment of the present invention.

Referring now to FIG. 5, an exemplary operation 500 of ATM header compression module 206 of FIG. 2 is illustrated in accordance with at least one embodiment of the present invention. The operation 500 initiates at step 502 wherein one or more hash functions are applied to the header of an outgoing ATM cell to generate a hash table index from the value of the header. Any of a variety of hash functions may be used as appropriate. In at least one embodiment, the hash function preferably is implemented as a plug-in module that may be replaced or alternated to handle different VPI/VCI assignments. In at least one embodiment, the following hash function may be used by the ATM header compression module 206:

$$HASH(x) = \left(\sum_{i=1}^{4} B_i \ \&0x70\right) >> 4 \qquad \text{EQ. 1}$$

where HASH(x) represents the resulting header table index, $B_i$ represents header byte i for i=0 to 4 (i.e., not including the HEC byte at byte 5 of the header). To summarize, EQ. 1 represents the sum of bits 6, 5 and 4 of the first four bytes of the ATM cell header. Additionally, when performing the hash function, the least significant bit (LSB) of the PTI field 116 (FIG. 1) may be masked to adapt the compression technique to the ATM adaptation layer 5 (AAL5) header format.

A header table index is generated as a result of the application of the hash function to the outgoing ATM cell header at step 502. At step 504, the entry of the header table 210 corresponding to the resulting header table index is accessed by the ATM compression module 206. If the entry is empty (i.e., a valid header is not stored in the entry), the first four bytes of the original header (e.g., the values of the GFC field 102, the VPI fields 104 and 106, the VCI fields 108-114, the PTI field 116 and the CLP file 118) may be stored in the respective table entry of the header table 210 at step 506. Because the header table 210 has changed as a result of step 506, the transmitting device 202 may create an idle cell 400 (FIG. 4) having some or all of the header values stored in the header table 210 and transmitting idle cell 400 to the receiving device 204 at step 508. The receiving device 204 then may update the header table 240 by replacing its contents with the contents of the header table field 420 of the idle cell 400. After updating the receiving device 204 with the idle cell, at step 510 the transmitting device 202 may replace the original header of the outgoing ATM cell with a reduced one byte header having the appropriate values for the flag field 302, PTI-bit 0 field 308 and parity field 310 (FIG. 3). Further, the reduced header preferably includes, in the header table index field 304 (FIG. 3), the header table index of the header table entry used to store the four bytes of the original header. The resulting reduced ATM cell with the reduced header then may be transmitted to the receiving device 204.

If, however, the corresponding header table entry is not empty at step 504, the ATM header compression module 206 may check for a hash collision at step 512. A hash collision may be identified by comparing the value of the four header bytes of the outgoing ATM cell with the four header bytes stored at the header table entry. If they substantially match, no hash collision took place and the original header of the ATM cell may be replaced at step 510 with a reduced one byte header having the header table index stored at the header table index field 304 (FIG. 3) of the reduced header. The resulting reduced ATM cell having the reduced header then may be transmitted to the receiving device 204 (FIG. 2). Additionally, the value (i.e., the "hit count") of the entry of the hit counter table 212 (FIG. 2) corresponding to the header table entry may be incremented at step 514. As discussed below, the hit counts of the hit counter table 212 may be used to periodically remove stored headers that are used infrequently.

At least one implementation of the present invention may be beneficially used in ATM-based systems having up to eight sequential VPI or VCI channels in addition to an extra operation and maintenance (OAM) VPI/VCI channel. Accordingly, entries 1 to 8 of the header table 210 may be assigned to a respective one of the eight VPI/VCI channels, leaving entries 9 to 11 available for other uses. In the event that the four header bytes of the outgoing ATM cell do not substantially match the stored header bytes at step 512, the header bytes of the outgoing ATM cell may be compared to the value stored at a predetermined available entry (assume entry 9 for this example, with entries 10 and 11 reserved for other uses). If the header bytes substantially match, the hit counter value of the hit counter table 212 may be incremented at step 518 and the original five byte header may be replaced with a reduced one byte header having a header table index of nine (corresponding to the header stored at entry 9) at step 510. The resulting reduced ATM cell then may be transmitted to the receiving device 204. In the event that the four bytes of the original header and the four bytes stored at header table entry 9 don't substantially match, a miss counter may be incremented at step 520 and the outgoing ATM cell may be transmitted without header modification to the receiving device 204 at step 522.

Upon generation of another outgoing ATM cell at step 524, the steps 502-522 may be repeated. It may be advantageous to periodically update the hash table 210 so that headers that are used infrequently are removed so that other headers may be stored instead. Accordingly, after a certain number of ATM cells are transmitted (e.g., every $69^{th}$ frame in discrete multitone (DMT) systems), the ATM compression module 206, at step 526, may evaluate the hit counts of the respective header table entries stored in the hit count table 212. Those entries having a low hit count (i.e., are used relatively infrequently) may be reinitialized with a null value so that new headers may subsequently be stored. Likewise, if the miss counter is above a certain threshold, it may be advantageous to replace the header stored in entry 9 with another header value more likely to be used.

Figure 6:
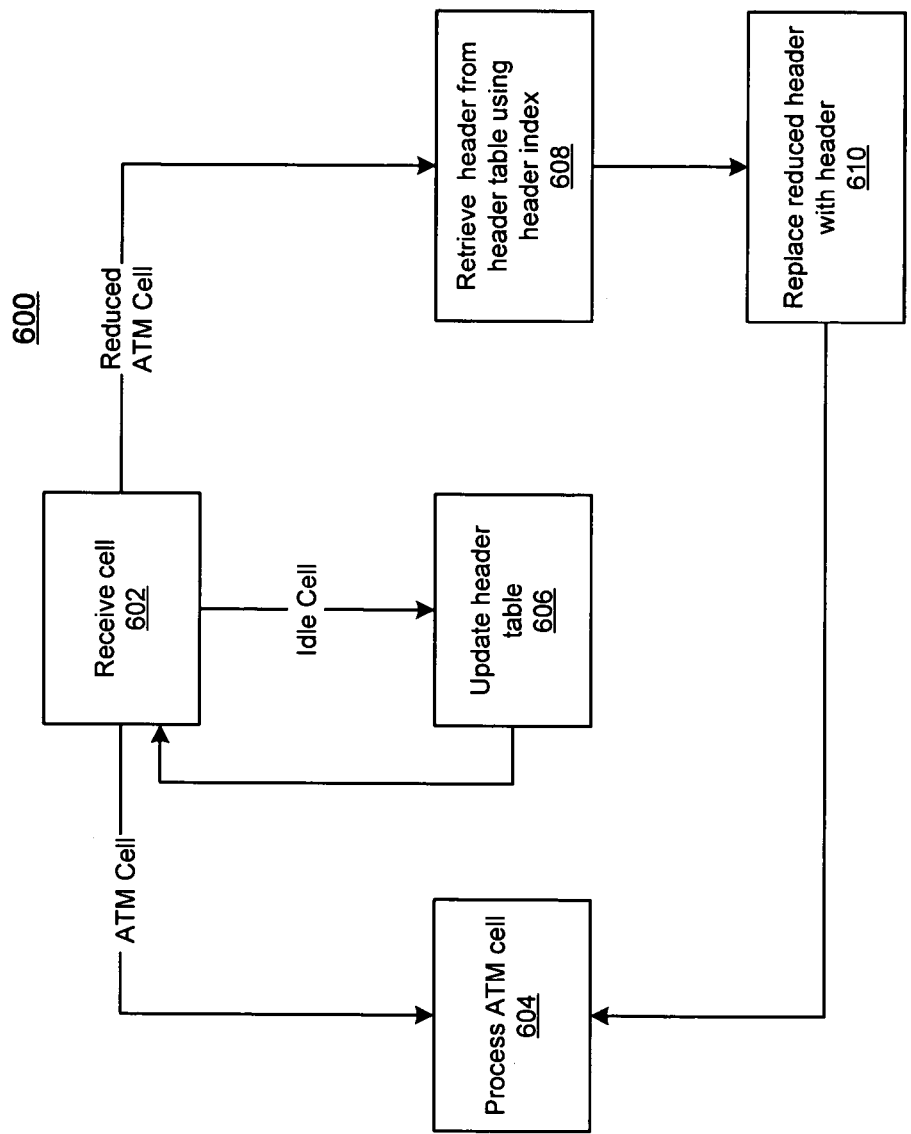
FIG. 6 is a flow diagram illustrating an exemplary technique for decompressing a reduced ATM cell in accordance with at least one embodiment of the present invention.

Referring now to FIG. 6, an exemplary operation 600 of the ATM decompression module 236 of FIG. 2 is illustrated in accordance with at least one embodiment of the present invention. The operation 600 initiates at step 602 wherein an ATM cell is received from the transmitting device 202 (FIG. 2). In the event that the ATM cell is an unreduced ATM cell, the ATM cell may bypass the ATM header decompression module 236 and be processed in a conventional manner at step 604. Otherwise, if the ATM cell is an idle cell having updated hash table information, at step 606 the ATM header decompression module 236 may replace the contents of the header table 240 with the contents of the header table field 420 (FIG. 4) of the idle cell. If the received ATM cell is a reduced ATM cell, the value stored in the header table index field 304 (FIG. 3) may be used to access the corresponding entry of the header table 240 at step 608. The ATM decompression module 236 then may replace the reduced header with the header stored in the corresponding header table entry at step 610 to convert the reduced ATM cell back into an unreduced ATM cell. In at least one embodiment, the fifth byte of the header, the HEC field, may be recreated at the receiving device 204 from the recovered four header bytes. The unreduced ATM then may be processed further by the receiving device 204 at step 604.

It will be appreciated that in certain instances, particularly in ATM/DMT systems, the use of reduced ATM cells will cause difficulty in maintaining the correct cell boundary. Accordingly, in at least one embodiment, a cell boundary indicator (CBI) is added to the DMT framing structure as the second overhead byte of a DMT superframe. The CBI preferably has a value between 0 and 52. The CBI represents the number of bytes after the start of the symbol ($2^{nd}$ DMT symbol) that is the start of a cell, whether reduced, unreduced or idle.

Consistent with the scope and spirit of the present invention, other embodiments are also provided. In one embodiment, a computer readable medium is provided for enabling communicating one or more asynchronous transfer mode (ATM) cells from a transmitting device to a receiving device via a network. In this embodiment, the computer readable medium comprises a set of executable instructions adapted to manipulate a processor to: determine, for a first ATM cell, an index based at least in part on a header of the first ATM cell;

identify a first entry of a first header table using the index, the first header table being maintained by the transmitting device and having a plurality of entries storing header data; replace the header of the first ATM cell with a reduced header to generate a reduced ATM cell based at least in part on a comparison of the header of the first ATM cell with header data stored at the first entry of the first header table, wherein the reduced header includes index data; and provide the reduced ATM cell for transmission to receiving device.

In other embodiments, the header of the first ATM cell is replaced with the reduced header when the header of the first ATM cell substantially matches the header data stored at the first entry of the first header table.

In other embodiments, the computer readable medium further comprises executable instructions adapted to manipulate the processor to: determine, for a second ATM, a second index based at least in part on a header of the second ATM cell; identify a second entry of the first header table using the second index; provide the second ATM cell for transmission to the receiving device when the header of the second ATM cell does not substantially match header data stored at the second entry of the first header table.

In other embodiments, the computer readable medium further comprises executable instructions adapted to manipulate the processor to: store the header of the first ATM cell at the first entry of the first header table when the first entry is empty; and provide a second ATM cell for transmission to the receiving device, the second ATM cell including a data representative of at least part of the first header table including the first entry.

In still other embodiments, the executable instructions are adapted to manipulate the processor to determine the index include executable instructions to manipulate the processor to perform a hash function on at least part of the header of the first ATM cell. More specifically, the hash function is represented by an equation: 7 HASH $(x)=(i=14\ B_i\ \&\ 0\times70)\ 4$ where HASH$(x)$ represents the index, $B_i$ represents byte i of the header of the first ATM cell for i=0 to 4.

In yet another embodiment, a computer readable medium is provided for enabling communicating one or more asynchronous transfer mode (ATM) cells from a transmitting device to a receiving device, the computer readable medium comprising a plurality of executable instructions adapted to manipulate a processor to: receive, at the receiving device, a first reduced ATM cell having a reduced header from the transmitting device, the reduced header including index data; identify a first entry of a first header table using the index data, the first header table being maintained by the receiving device and having a plurality of entries storing header data; and replace the reduced header of the first reduced ATM cell with header data stored at the first entry of the first header table to generate an unreduced ATM cell.

In certain embodiments, the index data is derived at least in part from an unreduced representation of the reduced header of the first reduced ATM cell. In other embodiments, the index data is derived from an application of a hash function to at least part of the unreduced representation of the reduced header. In addition, the hash function is represented by an equation: 8 HASH $(x)=(i=14\ B_i\ \&\ 0\times70)\ 4$ where HASH$(x)$ represents the index data, $B_i$ represents byte i of the header for i=0 to 4.

In other embodiments, the computer readable medium further comprises executable instructions adapted to manipulate the processor to: receive, at the receiving device, a second ATM cell, the second ATM cell having data representative of at least part of a table of one or more headers; and update one or more entries of header table based at least in part on the data representative of at least part of the table of one or more headers.

Other embodiments, uses, and advantages of the invention will be apparent to those skilled in the art from consideration of the specification and practice of the invention disclosed herein. The specification and drawings should be considered exemplary only, and the scope of the invention is accordingly intended to be limited only by the following claims and equivalents thereof.

What is claimed is:

1. A method for communicating one or more asynchronous transfer mode (ATM) cells from a transmitting device to a receiving device via a network, the method comprising:

determining, for a first ATM cell, an index based at least in part on a header of the first ATM cell;

identifying a first entry of a first header table using the index, the first header table being maintained by the transmitting device and having a plurality of entries storing header data;

replacing the header of the first ATM cell with a reduced header to generate a reduced ATM cell based at least in part on a comparison of the header of the first ATM cell with header data stored at the first entry of the first header table, wherein the reduced header includes index data; and transmitting the reduced ATM cell for receipt by the receiving device.

2. The method as in claim 1, wherein the header of the first ATM cell is replaced with the reduced header when the header of the first ATM cell substantially matches the header data stored at the first entry of the first header table.

3. The method as in claim 1, further comprising the steps of:

determining, for a second ATM, a second index based at least in part on a header of the second ATM cell;

identifying a second entry of the first header table using the second index;

transmitting the second ATM cell for receipt by the receiving device when the header of the second ATM cell does not substantially match header data stored at the second entry of the first header table.

4. The method as in claim 1, further comprising the step of clearing the first entry of the first header table when the header data stored at the first entry is used infrequently.

5. The method as in claim 1, further comprising the steps of:

storing the header of the first ATM cell at the first entry of the first header table when the first entry is empty; and transmitting a second ATM cell for receipt by the receiving device, the second ATM cell including a data representative of at least part of the first header table including the first entry.

6. The method as in claim 5, further comprising the steps of:

updating one or more entries of a second header table maintained by the receiving device based at least in part on the data representative of at least part of the first header table, wherein the second header table is used by the receiving device to replace reduced headers with corresponding unreduced headers and is substantially equivalent to the first header table.

7. The method as in claim 1, further comprising the steps of:

identifying a first entry of a second header table maintained by the receiving device using the index data of the reduced header of the reduced ATM cell, wherein the second header table is substantially equivalent to the first header table; and replacing the reduced header of the reduced ATM cell with header data stored at the first entry of the second header table to generate a second ATM cell at the receiving device, wherein the second ATM cell is substantially equivalent to the first ATM cell.

8. The method as in claim 7, further comprising the steps of:

storing the header of the first ATM cell in the first entry of the first header table when the first entry is empty; and transmitting a third ATM cell to the receiving device, the third ATM cell including data representative of at least part of the first header table including the first entry.

9. The method as in claim 8, further comprising the step of updating one or more entries of the second header table based at least in part on the data representative of at least part of the first header table.

10. The method as in claim 9, wherein the second ATM cell is transmitted before the first ATM cell is transmitted.

11. The method as in claim 1, wherein the step of determining the index includes performing a hash function on at least part of the header of the first ATM cell.

12. The method as in claim 11, wherein the hash function is represented by an equation:

$$HASH(x) = \left(\sum_{i=1}^{4} B_i \ \&0x70\right) >> 4$$

where HASH(x) represents the index, $B_i$ represents byte i of the header of the first ATM cell for i=0 to 4.

13. The method as in claim 1, wherein the reduced header further includes a flag field identifying the reduced header as a reduced header.

14. The method as in claim 1, wherein the reduced header includes a parity bit field.

15. The method as in claim 1, wherein the reduced header includes a least significant bit of a payload type indicator (PTI) field of the first ATM cell.

16. The method as in claim 1, wherein the transmitting device includes a digital subscriber line (DSL) modem.

17. The method as in claim 1, wherein the receiving device includes a digital subscriber line (DSL) modem.

18. The method as in claim 1, wherein the step of transmitting the reduced ATM cell for receipt by the receiving device includes transmitting the reduced ATM cell to the receiving device via an intermediary device.

19. A method for communicating one or more asynchronous transfer mode (ATM) cells from a transmitting device to a receiving device, the method comprising: receiving, at the receiving device, a first reduced ATM cell having a reduced header from the transmitting device, the reduced header including index data; identifying a first entry of a first header table using the index data, the first header table being maintained by the receiving device and having a plurality of entries storing header data; and replacing the reduced header of the first reduced ATM cell with header data stored at the first entry of the first header table to generate an unreduced ATM cell; receiving, at the receiving device, a second ATM cell, the second ATM cell having data representative of at least part of a table of one or more headers; and updating one or more entries of header table based at least in part on the data representative of at least part of the table of one or more headers.

20. The method as in claim 19, wherein the index data is derived at least in part from an unreduced representation of the reduced header of the first reduced ATM cell.

21. The method as in claim 19, wherein the index data is derived from an application of a hash function to at least part of the unreduced representation of the reduced header.

22. The method as in claim 21, wherein the hash function is represented by an equation:

$$HASH(x) = \left(\sum_{i=1}^{4} B_i \ \&0x70\right) >> 4$$

where HASH(x) represents the index data, $B_i$ represents byte i of the header for i=0 to 4.

23. A transmitting device for communicating one or more asynchronous transfer mode (ATM) cells for receipt by a receiving device via a network, the transmitting device comprising:

a header table having a plurality of entries for storing header data;

a compression module having access to the header table and being adapted to:

determine, for a first ATM cell, an index based at least in part on a header of the first ATM cell;

identify a first entry of the header table using the index; and replace the header of the first ATM cell with a reduced header to generate a reduced ATM cell based at least in part on a comparison of the header of the first ATM cell and a header stored at the first entry of the header table, the reduced header including index data; and means for transmitting the reduced ATM cell for receipt by the receiving device.

24. The transmitting device as in claim 23, wherein the header of the first ATM cell is replaced with the reduced header when the header of the first ATM cell substantially matches the header data stored at the first entry of the header table.

25. The transmitting device as in claim 23, wherein the compression module is further adapted to:

determine, for a second ATM cell, a second index based at least in part on a header of the second ATM cell;

identify a second entry of the header table using the second index; and provide the second ATM cell for transmission to the receiving device when the header of the second ATM cell does not substantially match header data stored at the second entry of the header table.

26. The transmitting device as in claim 23, wherein the compression module is further adapted to clear the first entry of the header table when the header data stored at the first entry is used infrequently.

27. The transmitting device as in claim 23, wherein the compression module is further adapted to:

store the header of the first ATM cell at the first entry of the header table when the first entry is empty; and provide a second ATM cell for transmission to the receiving device, the second ATM cell including data representative of at least part of the header table including the first entry.

28. The transmitting device as in claim 27, wherein the compression module provides the second ATM cell for transmission before providing the reduced ATM cell for transmission.

29. The transmitting device as in claim 23, wherein the compression module is adapted to determine the index by performing a hash function on at least part of the header of the first ATM cell.

30. The transmitting device as in claim 29, wherein the hash function is represented by an equation:

$$HASH(x) = \left(\sum_{i=1}^{4} B_i \ \&0x70\right) >> 4$$

where HASH(x) represents the index, $B_i$ represents byte i of the header of the first ATM cell for i=0 to 4.

31. The transmitting device as in claim 23, wherein the transmitting device includes a digital subscriber line (DSL) modem.

32. The transmitting device as in claim 23, wherein the means for transmitting the reduced ATM cell for receipt by the receiving device includes means for transmitting the reduced ATM cell to the receiving device via an intermediary device.

33. A receiving device for receiving one or more asynchronous transfer mode (ATM) cells from a transmitting device via a network, the receiving device comprising: means for receiving a reduced ATM cell having a reduced header, the reduced header including index data; a header table having a plurality of entries for storing header data; a decompression module operably connected to the means for receiving the reduced ATM cell and having access to the header table, the decompression module adapted to: identify a first entry of the header table using the index data from the reduced header, the first entry storing header data; and replace the reduced header of the first reduced ATM cell with the header data stored by the first entry to generate an unreduced ATM cell; means for receiving a second ATM cell, the second ATM cell including data representative of at least part of a table of one or more headers and wherein the decompression module is further adapted to update one or more entries of the header table based at least in part on the data representative of at least part of the table of one or more headers.

34. The receiving device as in claim 33, wherein the index data is derived at least in part from an unreduced representation of the reduced header.

35. The receiving device as in claim 34, wherein the index data is derived from an application of a hash function to at least part of the unreduced representation of the reduced header.

36. The receiving device as in claim 35, wherein the hash function is represented by an equation:

$$HASH(x) = \left(\sum_{i=1}^{4} B_i \ \&0x70\right) >> 4$$

where HASH(x) represents the index data, $B_i$ represents byte i of the unreduced representation of the reduced header for i=0 to 4.

37. A system for communicating one or more asynchronous transfer mode (ATM) cells via a network, the system comprising:

a transmitting device including:
   a first header table having a plurality of entries for storing header data;
   a compression module having access to the first header table and adapted to:
     determine, for a first ATM cell, an index based at least in part on a header of the first ATM cell;
     identify a first entry of the first header table using the index; and
     replace the header of the first ATM cell with a reduced header to generate a reduced ATM cell based at least in part on a comparison of the header of the first ATM cell with header data stored at the first entry of the first header table, the reduced header including index data; and
   means for transmitting the reduced ATM cell via the network; and
a receiving device operably connected to the transmitting device via the network and comprising:
   means for receiving the reduced ATM cell via the network;
   a second header table having a plurality of entries for storing header data, the second header table being substantially equivalent to the first header table;
   a decompression module operably connected to the means for receiving the first reduced ATM cell and having access to the second header table, the decompression module adapted to:
     identify a first entry of the second header table using the index data from the reduced header of the reduced ATM cell, the first entry of the second header table storing header data; and
     replace the reduced header of the reduced ATM cell with the header data stored at the first entry of the second header table to generate a second ATM cell substantially equivalent to the first ATM cell.

38. The system as in claim 37, wherein the header of the first ATM cell is replaced with the reduced header when the header of the first ATM cell substantially matches the header data stored at the first entry of the first header table.

39. The system as in claim 37, wherein the compression module is further adapted to:
determine, for a third ATM cell, a second index based at least in part on a header of the third ATM cell;
identify a second entry of the first header table using the second index; and
provide the third ATM cell for transmission via the network when the header of the third ATM cell does not substantially match header data stored at the second entry of the first header table.

40. The system as in claim 37, wherein the compression module is further adapted to:
store the header of the first ATM cell in the first entry of the first header table when the first entry is empty; and
provide a third ATM cell for transmission to the receiving device, the third ATM cell having data representative of at least part of the first header table including the first entry.

41. The system as in claim 40, wherein the decompression module is further adapted to update one or more entries of the second header table based at least in part on the data representative of at least part of the first header table.

42. The system as in claim 37, wherein the compression module is adapted to determine the index by performing a hash function on at least part of the header of the first ATM cell.

43. The system as in claim 42, wherein the hash function is represented by an equation:

$$HASH(x) = \left(\sum_{i=1}^{4} B_i \ \&0x70\right) >> 4$$

where HASH(x) represents the index, $B_i$ represents byte i of the header of the first ATM cell for i=0 to 4.

44. The system as in claim 37, wherein the means for transmitting the reduced ATM cell for receipt by the receiving device includes means for transmitting the reduced ATM cell to the receiving device via an intermediary device.

45. A computer readable medium for enabling communicating one or more asynchronous transfer mode (ATM) cells from a transmitting device to a receiving device via a network, the computer readable medium storing a set of executable instructions adapted to manipulate a processor to:
   determine, for a first ATM cell, an index based at least in part on a header of the first ATM cell;
   identify a first entry of a first header table using the index, the first header table being maintained by the transmitting device and having a plurality of entries storing header data;
   replace the header of the first ATM cell with a reduced header to generate a reduced ATM cell based at least in part on a comparison of the header of the first ATM cell with header data stored at the first entry of the first header table, wherein the reduced header includes index data; and
   provide the reduced ATM cell for transmission to receiving device.

46. The computer readable medium as in claim 45, wherein the header of the first ATM cell is replaced with the reduced header when the header of the first ATM cell substantially matches the header data stored at the first entry of the first header table.

47. The computer readable medium as in claim 45, further storing executable instructions adapted to manipulate the processor to:
   determine, for a second ATM, a second index based at least in part on a header of the second ATM cell;
   identify a second entry of the first header table using the second index;
   provide the second ATM cell for transmission to the receiving device when the header of the second ATM cell does not substantially match header data stored at the second entry of the first header table.

48. The computer readable medium as in claim 45, further storing executable instructions adapted to manipulate the processor to:
   store the header of the first ATM cell at the first entry of the first header table when the first entry is empty; and
   provide a second ATM cell for transmission to the receiving device, the second ATM cell including a data representative of at least part of the first header table including the first entry.

49. The computer readable medium as in claim 45, wherein the executable instructions adapted to manipulate the processor to determine the index include executable instructions to manipulate the processor to perform a hash function on at least part of the header of the first ATM cell.

50. The computer readable medium as in claim 49, wherein the hash function is represented by an equation:

$$HASH(x) = \left(\sum_{i=1}^{4} B_i \ \&0x70\right) >> 4$$

where HASH(x) represents the index, $B_i$ represents byte i of the header of the first ATM cell for i=0 to 4.

51. A computer readable medium for enabling communicating one or more asynchronous transfer mode (ATM) cells from a transmitting device to a receiving device, the computer readable medium storing a plurality of executable instructions adapted to manipulate a processor to: receive, at the receiving device, a first reduced ATM cell having a reduced header from the transmitting device, the reduced header including index data; identify a first entry of a first header table using the index data, the first header table being maintained by the receiving device and having a plurality of entries storing header data; and replace the reduced header of the first reduced ATM cell with header data stored at the first entry of the first header table to generate an unreduced ATM cell; receive, at the receiving device, a second ATM cell, the second ATM cell having data representative of at least part of a table of one or more headers; and update one or more entries of header table based at least in part on the data representative of at least part of the table of one or more headers.

52. The computer readable medium as in claim 51, wherein the index data is derived at least in part from an unreduced representation of the reduced header of the first reduced ATM cell.

53. The computer readable medium as in claim 51, wherein the index data is derived from an application of a hash function to at least part of the unreduced representation of the reduced header.

54. The computer readable medium as in claim 53, wherein the hash function is represented by an equation:

$$HASH(x) = \left(\sum_{i=1}^{4} B_i \ \&0x70\right) >> 4$$

where HASH(x) represents the index data, $B_i$ represents byte i of the header for i=0 to 4.

* * * * *